April 6, 1971  R. E. MOULD  3,574,045
SKIN-TEMPERED GLASS AND PROCESS FOR MAKING
Filed April 23, 1968
PRIOR ART
FIG. 1  FIG. 2  FIG. 3  FIG. 4
(a)
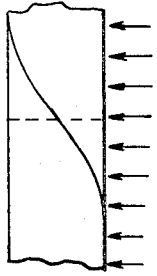
(b)
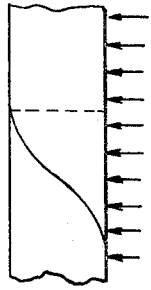
(c)
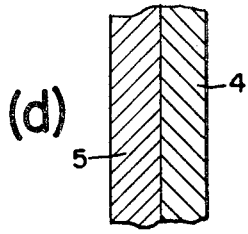 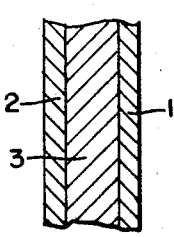 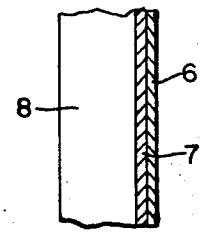 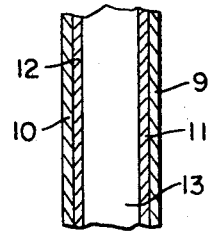
(d)
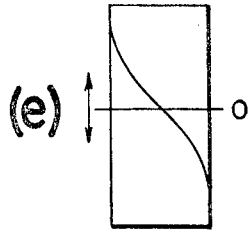 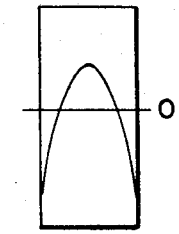 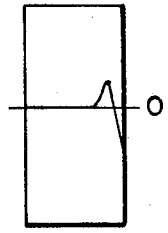 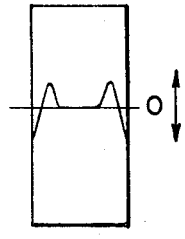
(e)

United States Patent Office 3,574,045
Patented Apr. 6, 1971

3,574,045
SKIN-TEMPERED GLASS AND PROCESS FOR MAKING
Richard E. Mould, Butler, Pa., assignor to Glass Container Industry Research Corporation, New Castle, Pa.
Filed Apr. 23, 1968, Ser. No. 723,395
Int. Cl. C03b 27/00
U.S. Cl. 161—164          19 Claims

ABSTRACT OF THE DISCLOSURE

A superfield temper is imparted to a surface or surface portion of a glass object by heating to a temperature within the viscoelastic range of the glass sufficiently to render the glass at said surface portion less viscous than the remainder of the glass at the interior of the object, and then quenching the heated surface portion to create a temperature gradient therein. The rates of heating and of quenching are desirably sufficiently high to avoid significantly raising the temperature of the rest of the cross-section of the glass at the surface portion. The temper can be imparted to all or part of one or more surfaces of the glass object, resulting in a thin compression layer on the treated surface, an adjacent compensating tension layer, and a neutral layer practically free of significant stress. Other features of the invention appear in the following specification and accompanying drawing.

BACKGROUND OF THE INVENTION

The present invention relates to a process for imparting a surface layer in compression to all or a portion of at least one surface of a glass object, and to glass objects having a skin temper.

Glass generally has a very high compressive strength, but its tensile strength is usually considerably lower. The strength of newly formed glass surfaces is much higher than that of glass which has been handled or otherwise abraded, even if handled only to a small extent. It has been observed that in a bottle the breaking strength of the inside surface, which is not subject to superficial damage, is on the order of ten times that of the outer surface. Consequently, the outer surface of a bottle is considerably more in need of reinforcement than is its interior.

Tempering has been practiced in the prior art as a means of reinforcing glass articles. The article is heated to a suitably high temperature and then compressive stresses are created on the surface of the article by quenching the hot glass so that its surface solidifies and contracts while its interior portions are still relatively more fluid. As quenching progresses, the tendency of the interior portions to set and contract is resisted by the solidified surface layers, which are thus placed into compression. As cooling proceeds and the temperature gradient between the hot interior and the cooler exterior diminishes, the interior is increasingly put into tension. Thus the resulting stresses are of thermal origin and reach an equilibrium upon the dissipation of the temperature gradient across the object.

The consequences of prior art tempering techniques may be more readily appreciated by reference to the accompanying drawing, in which each illustration (a) shows the temperature distribution across a cross-section of a glass object before commencement of the quenching step of tempering; each illustration (b) shows the temperature distribution after quenching is commenced; and each illustration (c) shows the temperature distribution at a time subsequent to the showing of the corresponding illustration (b). Illustrations (d) and (e) are representations of the ultimate strain distribution, illustration (d) showing the sequence of layers of strain throughout the glass, and illustration (e) being a representation of the strain pattern distribution throughout the cross-section of the glass.

Referring to FIG. 2, which represents the prior art tempering method just discussed, and as represented by the solid transverse line in FIG. 2(a), in prior art tempering processes the entire cross-section of the glass object or of the area of the object to be tempered is uniformly heated to a suitably high temperature at which the quenching step of the tempering process is initiated. At this point the glass is in a stress-free condition by reason of its relatively low viscosity. While the glass can be regarded as fluid for the purpose of stress equalization, it is not so fluid that the article becomes deformed, provided it is handled with due care. As the article is quenched, indicated in FIG. 2(b) by the arrows, is temperature of the surfaces exposed to quenching declines while the temperature of the interior layers decreases substantially less rapidly. As the glass cools it undergoes a process of solidification during which there is a relatively broad, viscosity-related temperature range which separates the fluid and the elastic states of glass, and in which range the glass has a viscoelastic character. This temperature range is referred to herein as the viscoelastic range. Creation of stress in glass, as by quenching, and relieving of stresses, as by annealing, can take place only when the glass is in the viscoelastic range.

As shown in the representation of the ultimate strain distribution in FIG. 2(d), compression layers 1 and 2 formed on the exterior surfaces exposed to the quenching, surround a counterbalancing tension layer 3, the transition from compression to tension being represented by the intermediate vertical lines shown as separating the layers. The nature of layers 1–3 is represented in FIG. 2(e), the central tension layer 3 being above the horizontal line O, and the outer compression layers 1 and 2 being below the horizontal, and the transition between compression and tension, being at the intersection of the curve with the horizontal line O. The layers 1–3, as represented by the lines of demarcation in FIG. 2(d), are, of course, not sharply delineated finite portions of the cross-section in every case. The transition of one layer into another adjoining layer can be often a gradual one.

Tempering of flat glass can be carried out readily in accordance with the prior art, because even though the tensile strength of the glass is considerably lower than its compressive strength, the tension layer counterbalancing the compression layer of tempered flat glass is located in the interior of the object. The interior is much less subject to destructive influences than is its surface, and the aim of the prior art tempering processes is, therefore, the creation of a tough compression layer on the suface to improve its strength and also to create a barrier preventing damaging influences from reaching the interior of the glass.

Prior art tempering methods used in connection with flat glass cannot be employed conveniently for the tempering of glass containers, because of difficulty of access to the interior of the container. FIG. 1 represents graphically the consequence of attempting to temper glass from one side only, e.g., the outside, the arrows in FIGS. 1(b) and 1(c), indicating the unilateral direction of quenching. As shown in FIG. 1(a), the temperature of the glass before quenching is commenced (represented by the solid transverse line) is above a temperature reference level (represented by the broken transverse line). The reference level used in the illustrative description can be conveniently viewed as for example, being at or somewhat above the annealing temperature of the glass. After quenching is commenced, as shown in FIG. 1(b), the temperature of the quenched surface decreases below the reference temperature, while the temperature of the opposed surface, which is not subjected to quenching, remains higher. As quenching continues, the condition shown in FIG. 1(c) obtains, the illustration representing the temperature distribution after the entire cooling glass body is below the reference temperature.

The distribution of the permanent strain resulting from carrying out the series of steps represented in FIG. 1, is shown in FIG. 1(d), wherein a compression layer 4 is formed on the side exposed to quenching, and a compensating tension layer 5 is formed on the opposing side. The strain pattern in FIG. 1(e) also represents this distribution, with the location of absence of strain being indicated by the horizontal line O. The vertical line separating the compression layer 4 from the tension layer 5 in FIG. 1(d), corresponds to the intersection of the curve with the horizontal line O in the illustration of 1(e). As the illustrations show, if tempering of glass containers is attempted to be carried out by quenching only the outside surface of the container, the inner surface will be placed in tension and the result will be an excessively fragile product. Various processes and associated apparatus have been proposed in the prior art for the tempering of glass containers by quenching both the inside and the outside surfaces of the container, analogously to flat glass, such as by lowering a device through the neck of the container and blowing air or a liquid therethrough onto the interior walls of the container. These processes have not been entirely acceptable, and such techniques require extensive mechanization and result in low production rates.

Heating of the entire glass object to a temperature at which it becomes soft and can be easily deformed in prior art tempering processes necessitates accurate process control and careful handling with sophisticated supporting equipment and auxiliary apparatus. It is consequently desirable to abbreviate the time during which the glass is exposed to such high temperatures.

As a fluid glass melt is cooled, a viscoelastic transformation occurs within the so-called softening temperature range within which the liquid melt gradually assumes the appearance of a solid material. The softening point is an arbitrarily selected and standardized point within this temperature range below which the viscosity of the glass is sufficiently high that no plastic deformation of the glass occurs under normal influences.

As a glass object is cooled below the softening point a temperature gradient is established between the slower-cooling interior of the object and the faster-cooling, more exposed exterior surfaces. Due to the thermal expansion characteristics of the glass, the cooler exterior surfaces tend to contract at a greater rate than the hotter interior portions of the glass, resulting in flow, and any ephemeral stresses which may occur will become equalized by internal displacement. As the viscosity of the cooling glass further increases, it will require longer times and greater forces to equalize the stresses by flow and the cooling glass eventually reaches a temperature at which the viscosity becomes so high that the stress-induced flow takes place very slowly and the stresses will not become equalized within very short periods of time. As further cooling brings about a further increase in viscosity, there is a temperature range below which the maintenance of a temperature gradient will result in retention of a relatively proportionate stress for a considerable period of time. That temperature is referred to as the annealing point, at which substantially complete equalization of the stresses may require as much as about 15 minutes.

As the glass continues to cool below the annealing point, it arrives at the strain point which is defined as the temperature at which the time required for relieving any stresses in the glass requires several hours. No significant permanent stresses can be introduced into glass below the strain temperature. As a practical matter, glass below the strain temperature may be regarded as having the character more of a solid than of a viscoelastic material.

The "annealing range" is essentially the temperature range between the annealing temperature and the strain temperature, and it is the rate of cooling within this range that will determine the ultimate, permanent strain pattern of glass. The tempering temperature of the glass is suitably higher than the annealing temperature, to enable the creation of desirably high compressive stresses, that is, to accomplish a desirably high degree of temper, by creating large temperature gradient between the interior and the outside of the glass, by quenching the outside. Quenching can be generally terminated once temperature of the entire glass body is below the strain temperature, or in the alternative, quenching can be continued until the entire glass object is at a suitable lower temperature.

SUMMARY OF THE INVENTION

In accordance with the present invention there is provided a process for imparting temper to all or a portion of at least one surface of a glass object, by substantially reducing the viscosity of the glass at said surface portion, relative to the viscosity of the glass at the interior of the object, by heating essentially only said surface portion to a temperature within the viscoelastic range of the glass, and then quenching the heated surface portion to create a temperature gradient therein. The rates of heating and of quenching are sufficient to avoid significantly raising the temperature of the parts of the glass object other than the directly heated surface portion. A cross-section of the resulting product has at least one surface layer in compression, a layer in tension adjoining the layer in compression, and a neutral layer practically free of significant stress and adjoining the layer in tension.

DESCRIPTION OF THE DRAWING

The invention is disclosed in greater detail in the following specification, with reference being had to the accompanying drawing comprising FIGS. 1–4, FIGS. 1 and 2 having been previously discussed in connection with prior art tempering techniques.

FIG. 1 is a schematic representation of tempering only one surface of a glass object, not employing the process of the present invention FIG. 2 is a schematic representation of tempering a glass object in accordance with the prior art;

FIG. 3 is a schematic representation of tempering one surface of a glass object or a portion of one surface in accordance with the present invention; and FIG. 4 is a schematic representation of tempering opposed surfaces of a glass object in accordance with the present invention.

A major feature of the present invention, schematically represented in FIG. 3, is the tempering of only one surface of a glass object or a portion of one surface, without creating a tension layer on the opposite surface as in the case of the process represented in FIG. 1.

Before heating of the surface is commenced, the glass is at a base temperature sufficiently high to prevent breakage of the object due to any temporary stresses which may occur during the intensive heating of the surface. The base temperature can be below the lowest temperature corresponding to the high-viscosity extreme of the viscoelastic range. Suitably the base temperature can be well within the viscoelastic range of the glass, which can often afford some convenience in and better control of the heating of the glass surface to the temperature at which quenching is commenced. For example, a temperature in the vicinity of the annealing point of the glass is a particularly convenient base temperature for the process of the present invention.

In the process shown in FIG. 3, an entire surface or a portion of one surface of a glass object which is at a base temperature is heated to a higher temperature within the visco-elastic range. As glass is a relatively poor conductor of heat, it is possible in accordance with the present invention to temper only one side of the object by intensively heating but a single surface or a selected portion thereof without significantly increasing the temperature of the interior or the opposed surface. As typically represented in FIG. 3(a), the heated surface portion disposed on the right-hand side of the object, has a very slight depth. The rest of the cross-section of the glass remains substantially at the lower base temperature. As quenching is commenced, the temperature of the surface immediately declines, as shown in FIG. 3(b), while the temperature of the glass immediately underlying the surface cools less rapidly. Thus a temperature gradient is established between the surface layer and the subsurface layer. As quenching continues, the temperatures throughout the surface and subsurface layers continue to fall, but as shown in FIG. 3(c), the subsurface cools more slowly than the surface layer. Quenching or some other measure of forced cooling to produce faster cooling than the rate of spontaneous cooling, can be suitably continued to a temperature where stresses cannot be relieved within meaningfully short periods of time. Quenching or forced cooling by other means can be suitably continued until the entire cross-section of the glass object is near to the lower end of or below the viscoelastic range.

Glass objects tempered in accordance with the process of the present invention have a typical permanent strain distribution illustrated by FIGS. 3(d) and (e). A compression layer 6 is formed on the exterior of the glass with an adjoining counterbalancing tension layer 7. The depth of the compression layer 6 largely corresponds to the depth of the quenched surface layer and the counterbalancing tension layer 7 largely corresponds to the subsurface layer. As shown in FIG. 3(d), a neutral layer 8 desirably constitutes a major portion of the cross-section of the glass. The neutral layer largely corresponds to the interior of the glass and the opposed surface, and is, so far as the tempering treatment of this invention is concerned, without significant strain in any direction. Maintenance of the neutral layer 8 in the substantially same strain condition as it was before heating of the surface was commenced, can be accomplished by controlling the rates of heating and cooling to avoid excessive heating of the interior layers and the unheated surface areas. If the glass was substantially strain-free to start with, the layer 8 will be without strain of practical significance. Depending upon the ultimate use of the object, in practice a minor amount of permanent strain is generally permissible. Since the process of the present invention can be carried out within a relatively short time, slight incidental heating of the interior will not result in the creation of significant strain in the neutral layer.

In the prior art tempering processes, the entire cross-section of the glass object is uniformly heated to the tempering temperature, and the temperature gradient which creates the permanent strain pattern is then established between each of the quenched surfaces and the interior. In contrast, two different temperature gradients are created in the process of the present invention. After the object has been brought to the base temperature, heating of the surface to the tempering temperature results in establishing a first temperature gradient between the heated portion and the interior, which is at the lower, base temperature. A second temperature gradient is thereafter established upon quenching, within the heated surface portion, that is, between the quenched surface layer and the subsurface layer. It is this second gradient which creates the permanent strain pattern of the surface-tempered item of the present invention. Establishment and maintenance of the second gradient is made possible by a relatively slow transfer of heat out of the subsurface layer because of the lower thermal conductivity of the glass. Such low heat transfer can contribute to the rate of cooling of the hotter subsurface layer lagging even further behind the cooling rate of the directly quenched surface layer. Tempering, in accordance with the present invention, takes place only within the surface and subsurface layers but with a measure of cooperation from the interior layers.

The depth of heating to bring the glass to the condition shown in FIG. 3(a) affects the depth of the ultimate resulting compression layer 6 shown in FIG. 3(d). The outer compression layer 6 needs to be only very thin relative to the thickness of the object cross-section, often even also relative to the neutral layer 8. If the depth of heating is unduly shallow, the thin heated layer may spontaneously cool too fast, before controlled cooling by way of the quenching step of tempering can take place. The minimum thickness of the compression layer 6 is preferably somewhat greater than the depth of the generally expectable flaws in the surface of a glass object which has been subjected to handling. The preferable depth of compression will vary from one kind of glass product to another. For example, reducing the viscosity of the surface to a sufficient depth and employing a suitably high quenching rate to obtain a compression layer of about a 0.005 inch depth is generally satisfactory for most glass containers. Greater depth of toughness may be accomplished by heating to a greater depth or by employing a faster rate of quenching, or both, with consequent imparting of a thicker compression layer on the surface.

In the tempering process of the invention illustrated in FIG. 3, if the depth of penetration of heat is too great, the counterbalancing tension layer 7 will move closer to the untempered side, which in an extreme case could result in elimination of the neutral layer 8 and an achievement of the undesirable condition shown in FIG. 1(d). The benefits of the present invention are obtained as long as there is a neutral layer present; however, very deep penetration of heat is preferably to be avoided, because in the case of glass objects tempered from one side only, a very thin neutral layer 8 might result in outcroppings of maximum tension at or near the untreated surface. If desired, the thickness of the neutral layer can exceed the combined thicknesses of the layer in compression and the layer in tension. In many commercial glasses the combined thicknesses of these layers can be less than about ¼ of the entire thickness of the cross-section of the glass object.

The depth of heating the glass surface is desirably controlled by employing means which are capable of transferring heat in a relatively intensive fashion, so that the surface and subsurface layers are rapidly brought to the tempering temperature to the desired depth, the low heat conduction coefficient of the glass preventing the interior layers from becoming too hot within this heating period. For example, in the case of gas burners, a natural gas-oxygen or hydrogen-oxygen flame is generally preferable to a natural gas-air flame. In cases where very intensive transfer of heat is desirable, heat sources such as plasma jets can advantageously be employed.

It is an important feature of the present invention that the need to heat only to a shallow depth across the cross-section of the glass permits the use of simpler and less expensive equipment, as well as shorter heating schedules with attendant fuel savings and convenience. Similarly, in carrying out the process of the present invention, the thickness of the portion which has to be rapidly cooled by quenchng, is considerably less than the thickness which has to be cooled in prior art tempering methods; consequently, the cooling step of the present invention can be carried out within shorter times and involves using lesser amounts of the cooling medium.

Generally, in the heating step of the present invention, the higher the intensity of heat transfer to the surface of the glass, the better the process can be controlled and the greater the economy. The heating step reduces the viscosity of the glass at the heated surface portion and renders it substantially less viscous and more fluid than the unheated portions which are at the base temperature. It is an advantage of the present invention that the fluidity of the heated surface portion can be greater than that practically employable in the practice of prior art tempering methods. A practical limitation on the rate of heat transfer, i.e., heating intensity, is imposed by the possibility that the surface of the object may become excessively fluid before a sufficiently deep penetration of heat is accomplished. For example, when using gas burners with high fuel pressure, formation of surface imperfections, such as ripples, may be encountered, which could objectionably affect the surface integrity of the glass object. Any such tendency can generally be overcome, for example, by terminating heating of the surface before it becomes unduly fluid, and permitting the glass to stand for a brief period of time to allow the surface heat to penetrate toward the interior. Quenching can be commenced when the viscosity of a surface layer of suitable thickness has been substantially reduced.

Quenching can be carried out by conventional techniques such as with air or other gases, oil, water, etc. If fast cooling of the glass to room temperature is desired, quenching can be extended in many cases to the point where the glass object can be touched with a bare hand. It is an advantage of the present invention that quenching rates faster than these employed in the prior art can be employed, because of greater insensitivity to breakage due to thermal shock.

Since the quenching step serves to establish a temperature gradient between the surface layer and the subsurface layer, the extent of compression created in the compression layer on the surface of the glass depends to a large extent on the quenching rate employed. The quenching rate used in carrying out the process of the present invention can be suitably higher than the rates employed in most prior art tempering processes, partly also because of the lesser thickness of the layers between which the temperature gradient is established in the present process. The use of higher quenching rates will also help prevent significant heating of the interior by the adjoining hotter subsurface layer. When only part of a surface of a glass object is tempered in accordance with the present invention, the area subjected to quenching can be suitably larger than the area of the surface portion which was heated prior to commencement of the quenching.

The optimum values for the base temperature, tempering temperature and quenchng rate will depend on a number of factors, such as characteristics of the glass, shape of the object, desired extent and depth of temper, and available equipment. The values for these variable can be determined and adjusted for a given case by routine experimentation and by examination of the resulting product.

FIG. 4 illustrates the tempering of a glass object from both sides, in accordance with the present invention. This process can be analogized to the process of the invention shown in FIG. 3, but in the process of FIG. 4 the phenomena are induced on both sides of the glass, resulting in exterior compression layers 9 and 10, respective counterbalancing tension layers 11 and 12, and neutral layer 13 in the center. Depending on the proportionate width of the neutral layer 13, and on the nature and extent of compression layers 9, 10, and of tension layers 11, 12, the neutral layer 13 may also permit cutting of the tempered product despite the presence of the relatively thin tempered outer layers. In accordance with this embodiment of the process of the present invention sequential tempering can be carried out by seriatim tempering first one side or a portion thereof, and then the opposite side.

The process of the present invention has a number of further advantages. Deformation of the object and loss of integrity of shape are often encountered in the prior art tempering processes where the entire object is heated to the relatively high tempering temperature. Since in the process of the present invention only one or both surface portions are heated to the tempering temperature, but the bulk of the glass remains at a temperature substantially below the deformation temperature of the glass, there is provided sufficient support for protection against deformation of the object. The process variables of the present invention generally do not depend on the actual thickness of the glass, and in the case of most glass objects of commerce, thickness of the obtainable compressive layer has no inherent relation to the overall thickness of the glass. It is possible, therefore, simultaneously to temper a variety of objects of widely different wall thicknesses.

A temper of essentially uniform depth can be obtained by the use of the process of the present invention, regardless of thickness variations within the same glass object. The ability to temper only one side of an object, makes the process of the present invention particularly advantageous for the skin tempering of glass containers, such as of bottles, where thickness variations of as much as 2:1 or more are often encountered.

In glass manufacture, after annealing, the shaped objects are often subjected to further cooling at rates lower than the rate of spontaneous cooling, regardless of whether the object is to be subsequently tempered or not, mainly to avoid the inducing of substantial temperature gradients in the cooling glass, which may create temporary stresses resulting in heat shock breakage. Large continuous lehrs are employed in continuous glassmaking processes for this purpose. In these the glass is transported, such as by a continuous belt, through decreasingly hot sections of the lehr. The initial, hotter portion of the lehr, where the actual annealing takes place, is usually relatively short since the annealing portion of the viscoelastic range of most glasses is less than 100° C. The succeeding section of the lehr is usually longer, because the temperature change of the glass in this portion is mot often over a span of several hundred degrees centigrade. The process of the present invention can be employed for example, at a point of the cooling cycle, immediately following the annealing portion, without need for further cooling, whereby its allows the use of shorter, less expensive lehrs in which there is no need for the larger, second portion of the lehr. This is made possible by the fact that the process of the present invention can be practiced upon a glass item which has passed through the annealing range. In some cases it would be possible entirely to eliminate the need for annealing a freshly shaped item before the process of the persent invention can be commenced.

Further illustrations of embodiments of the process of the present invention are given in the following detailed examples. In each example a 0.11 inch thick x ¾ inch x 1½ inch piece of annealed soda-lime-type plate glass, having an annealing point of about 520° C., and resting on a transit plate, is heated to the base temperature in an electric furnace. After the glass reaches the base temperature, it is removed from the furnace and a torch constituted of 13 in-line holes each having a diameter of 0.0225 inch drilled into a 1 inch long segment of ¼ inch inch O.D. copper tubing, is passed over the exposed surface of the glass at a given rate of travel. In Examples 1-3 the flame is composed of natural gas and oxygen, in Example 4 of propane and oxygen. Temperature is measured with a radiation thermometer sold by Ircon, Inc. under the designation Ircon Model 710, at a given point on the sample surface.

In Example 1, quenching is accomplished by placing an about 2 inch thick carbon block over the sample for about 45 seconds. The time difference between passing of the flame and contact by the carbon block is stated below with regard to a given monitored point of the sample. Ultimate stress evaluation is made at the same monitored point. In Example 2 quenching is accomplished by a single row, and in Examples 3 and 4 by a double row of air outlets spaced 0.85 inch from each other and traveling at a given distance from and at the same rate as the torch. The air outlets are 1/32 inch wide and 1½ inch long slots in ¼ O.D. copper tubing, with air being blown in at both ends of the tube. In Example 4 unheated air is blown over the entire glass surface from a manual hair dryer nozzle disposed ½ inch above the glass.

Further process details of Examples 1–4 are summarized in the following table.

| | Example No. | | | |
|---|---|---|---|---|
| | 1 | 2 | 3 | 4 |
| Base temperature, ° C | 503 | 547 | 504 | 490 |
| Tempering temperature, ° C | 853 | 821 | 744 | 817 |
| Surface temperature after quench, ° C | 200 | 532 | 508 | 405 |
| Flame travel rate, in. per min | 32 | 32 | 28 | 23 |
| Flow rate of oxygen, cu. ft./hr | 3.8 | 3.8 | 3.25 | |
| Flow rate of gas, cu. ft./hr | 2.75 | 2.75 | 1.92 | |
| Distance of torch from glass, inch | 0.26 | 0.26 | 0.20 | 0.23 |
| Distance of air orifice from glass, inch | | 0.1 | 0.31 | 0.1 |
| Distance of air outlet behind flame, inch | | 2 | 1.6 | 1.75 |
| Time between flame contact and quench, sec | 1.6 | 3.75 | 3.43, 5.25 | 4.55 |
| Cooling air pressure, p.s.i | | 50 | 40, 60 | 90, 90 |

After tempering, the samples are examined at room temperature under polarized light, using a polarizing microscope with a quartz wedge, to determine the nature and magnitude of the resulting permanent strain in the glass. In each example, the interior portion of the cross-section of the sample, including the untempered surface, is free from significant amounts of strain. The following results are found:

| | Example No. | | | |
|---|---|---|---|---|
| | 1 | 2 | 3 | 4 |
| Compression, p.s.i | 5,700 | 1,750 | 3,100 | 5,100 |
| Thickness of compression layer, inch | 0.012 | 0.016 | 0.012 | 0.014 |
| Tension, p.s.i | 4,400 | 1,400 | 2,700 | 4,060 |
| Combined thickness of compression and tension layers, inch | 0.041 | 0.059 | 0.048 | 0.047 |
| Depth of neutral layer, inch | 0.069 | 0.051 | 0.062 | 0.063 |

I claim:
1. A process for imparting temper to all or a portion of at least one surface of a glass object, which comprises reducing the viscosity of the glass at said surface portion, relative to the viscosity of the glass at the interior of the object, by subjecting said surface portion to a high temperature heat source for a time period of such duration whereby essentially only said surface portion is heated to at least about the tempering temperature of the glass, and then quenching the heated surface portion at a rate sufficient to temper at least a portion of the surface layer, the heating and quenching being effected at controlled rates so as to avoid significantly raising the temperature of the interior of the object.

2. A process according to claim 1, wherein said heating is accomplished by employment of high-intensity heating means.

3. A process according to claim 1, wherein before heating of said surface portion is commenced, the object is at a temperature within the viscoelastic range of the glass.

4. A process according to claim 3, wherein quenching of the glass is commenced after the surface portion becomes heated to a preselected depth.

5. A process according to claim 1, wherein only one surface or a portion thereof is heated and then quenched.

6. A process according to claim 3, wherein the glass object is a container, and the heated surface is the outer surface of the container or a portion thereof.

7. A process according to claim 1, wherein opposed surfaces of the object are heated and then quenched.

8. A process according to claim 7, wherein said opposing surfaces or portions thereof are tempered in sequence.

9. A process for imparting temper to all or a portion of at least one surface of a glass object, which comprises establishing a first temperature gradient between the surface portion of the object and its interior by subjecting said surface portion to a high temperature heat source for a time period of such duration whereby essentially only the surface portion is heated to at least about the tempering temperature of the glass, and then establishing a second temperature gradient between the surface layer and the immediately underlying subsurface layer of the heated surface portion by quenching the surface portion.

10. A process according to claim 9, wherein before establishing the first temperature gradient, the glass object is at a temperature within the viscoelastic range of the glass, and wherein during the establishing of said first and said second temperature gradients the temperature of the interior of the object, other than the immediately underlying subsurface layer, is not significantly raised.

11. A glass object having a relatively uniform chemical composition across its cross-section, said object having at least one surface layer in temperature-induced compression, a layer adjoining said surface layer in temperature-induced tension and adjoining said layer in tension a neutral layer practically free of significant stress resulting from the surface tempering process.

12. A glass object according to claim 11, characterized in that said neutral layer is thicker than the combined thicknesses of the layer in compression and the layer in tension.

13. A glass object according to claim 11, characterized in that the thickness of said layer in compression does not exceed about 0.005 inch.

14. A glass object according to claim 11, characterized in that the combined thicknesses of said layer in compression and of said layer in tension do not exceed about ¼ the cross-sectional thickness of said object.

15. A glass object according to claim 11, in which each of the surface layers is in temperature-induced compression, each of said surface layers is adjoined by a layer in temperature-induced tension, and a neutral layer substantially free of stress is disposed between said layers under tension.

16. A glass object according to claim 11, characterized in that the object is a glass container and said surface layer in compression is the external surface of the container or a portion thereof.

17. A glass object according to claim 11 having a compression maximum at the surface of the layer in compression.

18. A glass object according to claim 15 wherein said stress distribution has compression maxima at the surfaces of each of the layers in compression.

19. The process of claim 1 wherein the rate of quenching is such as to produce compressive stress at the surface.

References Cited

UNITED STATES PATENTS 3,107,196 10/1963 Acloque _____ 65—115X
3,287,201 11/1966 Chisholm et al. ____ 65—114X ARTHUR D. KELLOGG, Primary Examiner U.S. Cl. X.R.

65—114